United States Patent
Koshizuka et al.

(10) Patent No.: US 9,704,664 B2
(45) Date of Patent: Jul. 11, 2017

(54) MAGNETIZING INRUSH CURRENT SUPPRESSION DEVICE

(71) Applicant: Kabushiki Kaisha Toshiba, Minato-ku (JP)

(72) Inventors: Tadashi Koshizuka, Saitama (JP); Shiro Maruyama, Yokohama (JP); Minoru Saito, Kamakura (JP); Hiroyuki Maehara, Fuchu (JP); Koji Suzuki, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 288 days.

(21) Appl. No.: 14/527,230

(22) Filed: Oct. 29, 2014

(65) Prior Publication Data

US 2015/0055266 A1   Feb. 26, 2015

Related U.S. Application Data

(63) Continuation of application No. PCT/JP2013/061292, filed on Apr. 16, 2013.

(30) Foreign Application Priority Data

May 8, 2012 (JP) ................. 2012-106618

(51) Int. Cl.
*H01H 9/54* (2006.01)
*H02H 3/08* (2006.01)
(Continued)

(52) U.S. Cl.
CPC .............. *H01H 9/54* (2013.01); *H01H 9/563* (2013.01); *H01H 33/593* (2013.01);
(Continued)

(58) Field of Classification Search
CPC ...... H02H 3/083; H02H 7/0455; H02H 9/002; H01H 9/54; H01H 9/563; H01H 33/593
(Continued)

(56) References Cited

U.S. PATENT DOCUMENTS 6,493,203 B1   12/2002   Ito et al.
7,982,341 B2   7/2011   Konoshita et al.
(Continued)

FOREIGN PATENT DOCUMENTS

CN   1308354 A   8/2001
CN   1558482 A   12/2004
(Continued)

OTHER PUBLICATIONS

Machine translation of Koshizuka et al. Japanese Patent Document JP 201007366A Apr. 2, 2010.*
(Continued)

*Primary Examiner* — Thienvu Tran
*Assistant Examiner* — Kevin J Comber
(74) *Attorney, Agent, or Firm* — Oblon, McClelland, Maier & Neustadt, L.L.P.

(57) ABSTRACT

According to one embodiment, a magnetizing inrush current suppressing device is configured to measure a three-phase alternating current flowing from the power supply bus to the load, detect a first interruption phase as a phase of an electric current which is interrupted first among the three phases, detect a phase of a phase voltage zero point through which a phase voltage of the first interruption phase of the three-phase AC voltage passes when changing from the same polarity as that of an electric current immediately before interruption of the first interruption phase to an opposite polarity, and close the circuit-breaker at a phase within 60° from the detected phase.

4 Claims, 7 Drawing Sheets

(51) Int. Cl.
*H01H 9/56* (2006.01)
*H01H 33/59* (2006.01)
*H02H 7/045* (2006.01)
*H02H 9/00* (2006.01)

(52) U.S. Cl.
CPC .......... *H02H 3/083* (2013.01); *H02H 7/0455* (2013.01); *H02H 9/002* (2013.01)

(58) Field of Classification Search
USPC ....................................................... 361/115
See application file for complete search history.

(56) References Cited

U.S. PATENT DOCUMENTS

| | | |
|---|---|---|
| 8,310,106 B2 | 11/2012 | Koshiduka et al. |
| 2004/0124814 A1 | 7/2004 | Tsutada et al. |
| 2010/0141235 A1 | 6/2010 | Koshiduka et al. |
| 2011/0181989 A1 | 7/2011 | Udagawa et al. |
| 2014/0192443 A1 | 7/2014 | Koshizuka et al. |

FOREIGN PATENT DOCUMENTS

| | | |
|---|---|---|
| CN | 101563744 A | 10/2009 |
| JP | 2-179220 A | 7/1990 |
| JP | 2001-218354 A | 8/2001 |
| JP | 2008-160100 A | 7/2008 |
| JP | 2009-131106 A | 6/2009 |
| JP | 2010-073666 A | 4/2010 |
| JP | 4762073 B2 | 8/2011 |
| JP | 4762378 B1 | 8/2011 |
| JP | 4896858 B2 | 1/2012 |
| JP | 4611455 B2 | 10/2012 |

OTHER PUBLICATIONS

International Search Report mailed Jun. 11, 2013 for PCT/JP2013/061292 filed Apr. 16, 2013 with English Translation.

International Written Opinion mailed Jun. 11, 2013 for PCT/JP2013/061292 filed Apr. 16, 2013.

John H. Brunke et al., "Elimination of Transformer Inrush Currents by Controlled Switching—Part I: Theoretical Considerations", IEEE Transactions on power delivery, vol. 16, No. 2, Apr. 2001, pp. 276-280.

Combined Office Action and Search Report issued on Jan. 14, 2016 in Chinese Patent Application No. 201380024152.9 with English translation.

Office Action issued on Jan. 8, 2016 in Canadian Patent Application No. 2,872,637.

Office Action issued on Nov. 10, 2015 in Japanese Patent Application No. 2012-106618 with English translation.

\* cited by examiner

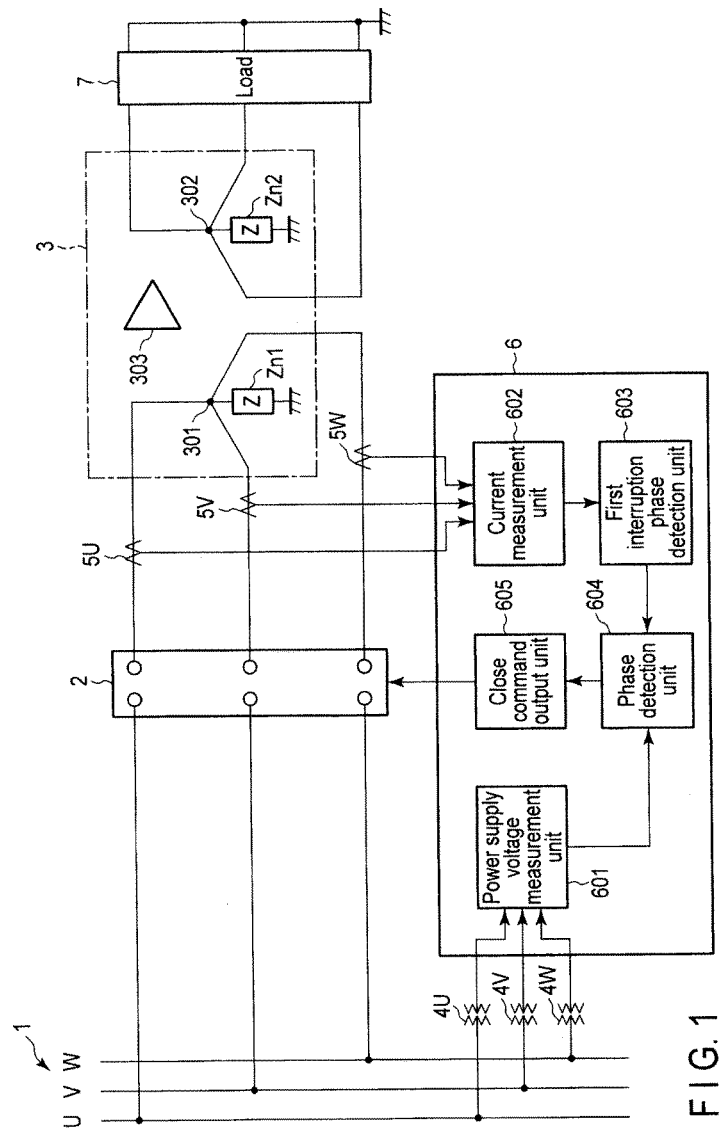
F I G. 1

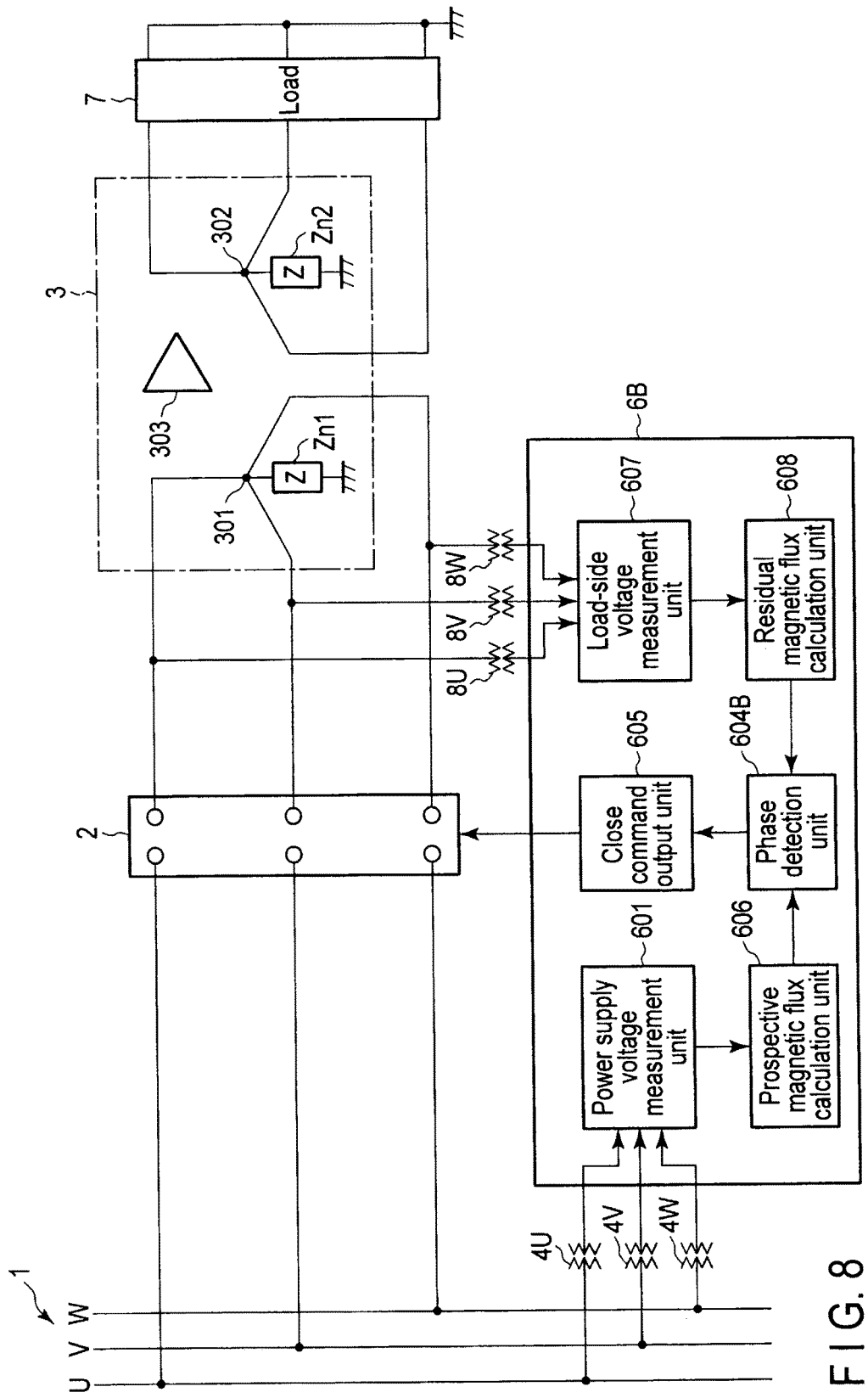
F I G. 8

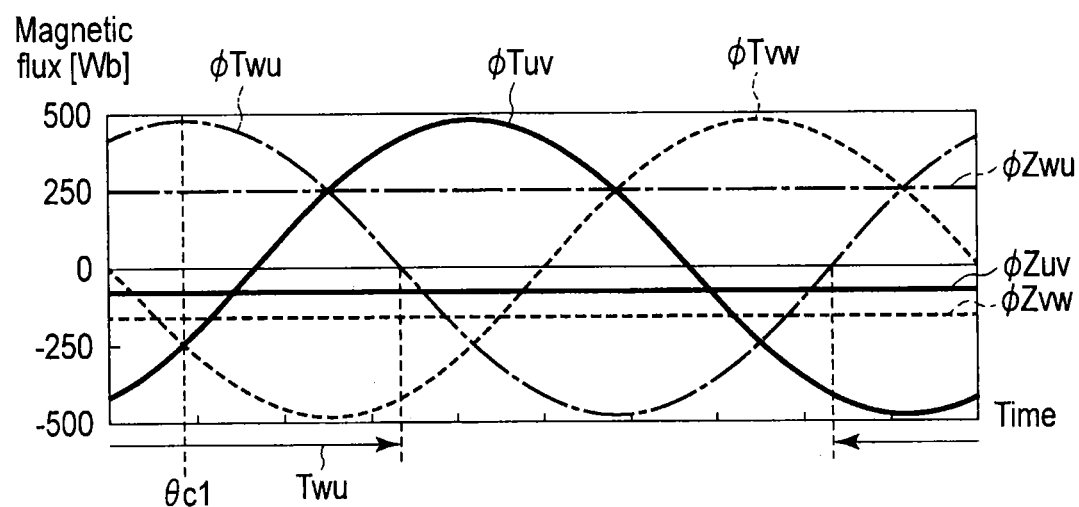
F I G. 9

MAGNETIZING INRUSH CURRENT SUPPRESSION DEVICE

CROSS-REFERENCE TO RELATED APPLICATIONS

This application is a Continuation application of PCT Application No. PCT/JP2013/061292, filed Apr. 16, 2013 and based upon and claiming the benefit of priority from Japanese Patent Application No. 2012-106618, filed May 8, 2012, the entire contents of all of which are incorporated herein by reference.

FIELD

Embodiments described herein relate generally to a magnetizing inrush current suppressing device for suppressing a magnetizing inrush current to be generated when powering on a transformer.

BACKGROUND

It is generally known that a large magnetizing inrush current flows when non-load magnetizing is performed by supplying power while a transformer core has a residual magnetic flux. The magnitude of this magnetizing inrush current is several times larger than the rated load current of the transformer. The system voltage fluctuates if a large magnetizing inrush current like this flows. If this voltage fluctuation is large, it may have affect customers.

As a method of suppressing this magnetizing inrush current, there is a method of controlling a close phase based on the residual magnetic flux. For example, a method is disclosed by which one arbitrary phase is first closed when turning on a directly-grounded three-phase transformer by using three single-phase circuit-breakers, and then two remaining phases are closed, thereby suppressing a magnetizing inrush current. Additionally, a method which suppresses a magnetizing inrush current when powering on a non-effectively grounded transformer by using a three-phase integrated type circuit-breaker is also disclosed.

Unfortunately, there is no known method which suppresses a magnetizing inrush current generated when opening or closing a circuit-breaker while a transformer is connected to a load. In addition, since a magnetizing inrush current and load current flow through a circuit-breaker while a transformer is connected to a load, a residual magnetic flux after shutdown differs from that when a non-load transformer is shut down.

BRIEF DESCRIPTION OF THE DRAWINGS

FIG. 1 is a view showing the configuration of a power system to which a magnetizing inrush current suppressing device according to the first embodiment of the present invention is applied;

FIG. 8 is a view showing the configuration of a power system to which a magnetizing inrush current suppressing device according to the third embodiment of the present invention is applied; and FIG. 9 is a waveform chart showing magnetic flux waveforms for explaining a target close phase range of the magnetizing inrush current suppressing device according to the third embodiment.

DETAILED DESCRIPTION

Figure 2:
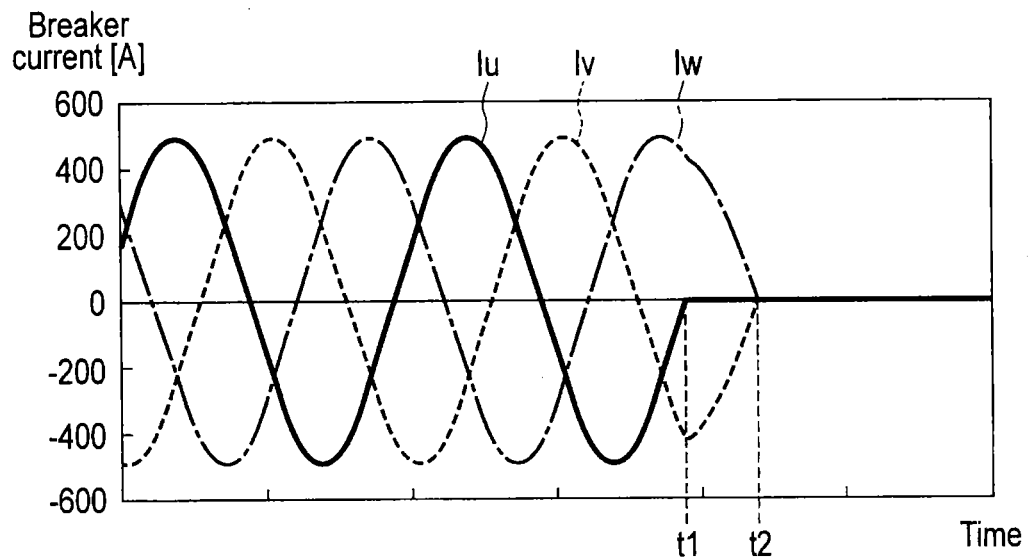
FIG. 2 is a waveform chart showing circuit-breaker currents before and after current interruption by a circuit-breaker according to the first embodiment.

Embodiments will be described with reference to the drawings.

In general, according to one embodiment, there is provided a magnetizing inrush current suppressing device for controlling a circuit-breaker which opens and closes a connection between a three-phase transformer and a three-phase AC power supply while a load is connected to the three-phase transformer to suppress a magnetizing inrush current, comprising: a power-supply-side voltage measurement unit configured to measure a three-phase AC voltage on the power supply side of the circuit-breaker; a current measurement unit configured to measure a three-phase alternating current flowing from the power supply to the load; a first interruption phase detection unit configured to detect a first interruption phase as a phase of an electric current which is interrupted first among the three phases, based on the three-phase alternating current measured by the current measurement unit; a phase detection unit configured to detect a phase of a phase voltage zero point through which a phase voltage of the first interruption phase, which is detected by the first interruption phase detection unit, of the three-phase AC voltage measured by the power-supply-side voltage measurement unit passes when changing from the same polarity as that of an electric current immediately before interruption of the first interruption phase to an opposite polarity; and a closing unit configured to close the circuit-breaker at a phase within 60° from the phase detected by the phase detection unit.

(First Embodiment)

FIG. 1 is a view showing the configuration of a power system to which a magnetizing inrush current suppressing device 6 according to the first embodiment of the present invention is applied. Note that the same reference numerals denote the same parts in the following drawings, a detailed explanation thereof will be omitted, and different sections will mainly be described. A repetitive explanation will be omitted in the subsequent embodiments as well.

The power system according to this embodiment includes a power supply bus 1, a circuit-breaker 2, a transformer 3, power supply voltage detectors 4U, 4V, and 4W for the three phases, current detectors 5U, 5V, and 5W for the three phases (transformer terminals), a magnetizing inrush current suppressing device 6, and a load 7.

The power supply bus 1 is the bus of a power system including a three-phase alternating current (AC) power supply having U, V, and W phases.

The primary side of the transformer 3 is connected to the power supply bus 1 via the circuit-breaker 2. The load 7 is always connected to the secondary side of the transformer 3. The transformer 3 is installed in a non-effectively grounded system. The transformer 3 is a three-winding, three-phase transformer for transforming a three-phase AC voltage. The transformer 3 includes primary, secondary, and tertiary windings 301, 302, and 303. The primary and secondary windings 301 and 302 are connected by a Y-connection. The tertiary winding 303 is connected by a Δ connection. The neutral point of the primary winding 301 is grounded by impedance Zn1. The neutral point of the secondary winding 302 is grounded by impedance Zn2.

The circuit-breaker 2 is inserted between the power supply bus 1 and transformer 3. The circuit-breaker 2 is a three-phase integrated type circuit-breaker in which the main contacts of all three phases, i.e., U, V, and W phases are operated at once. When the circuit-breaker 2 is closed, the transformer 3 is powered on by the power supply bus 1. When the circuit-breaker 2 is opened, the transformer 3 is electrically disconnected from the power supply bus 1.

The power supply voltage detectors 4U, 4V, and 4W are installed for the individual phases (U, V, and W phases) of the power supply bus 1. The three power supply voltage detectors 4U, 4V, and 4W are measurement devices for measuring the phase voltages (ground voltages) of the individual phases (U, V, and W phases) of the power supply bus 1. For example, the power supply voltage detectors 4U, 4V, and 4W are voltage dividers such as VTs (Voltage Transformers) or PDs (Potential Devices). The power supply voltage detectors 4U, 4V, and 4W are connected between ground and the individual phases of the power supply bus 1. The power supply voltage detectors 4U, 4V, and 4W output detected values as detection signals to the magnetizing inrush current suppressing device 6.

The current detectors 5U, 5V, and 5W are installed for the individual phases on the primary side (power supply side) of the transformer 3. The three current detectors 5U, 5V, and 5W are measurement devices for measuring electric currents flowing through the individual phases (U, V, and W phases) on the primary side of the transformer 3. For example, the three current detectors 5U, 5V, and 5W are CTs (Current Transformers). The three current detectors 5U, 5V, and 5W output detected values as detection signals to the magnetizing inrush current suppressing device 6.

The magnetizing inrush current suppressing device 6 outputs a close command to the main contacts of the circuit-breaker 2 based on the detection signals received from the power supply voltage detectors 4U, 4V, and 4W and current detectors 5U, 5V, and 5W. Consequently, the circuit-breaker 2 is closed.

The arrangement of the magnetizing inrush current suppressing device 6 will be explained with reference to FIGS. 1, 2, 3, 4, and 5.

Figure 3:
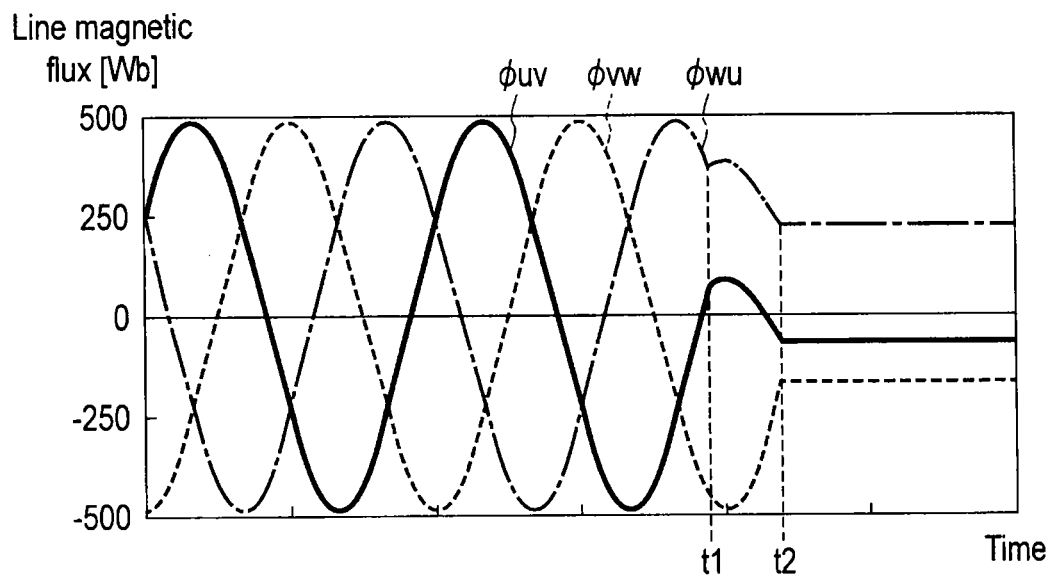
FIG. 3 is a waveform chart showing line magnetic fluxes before and after current interruption by the circuit-breaker according to the first embodiment.
Figure 4:
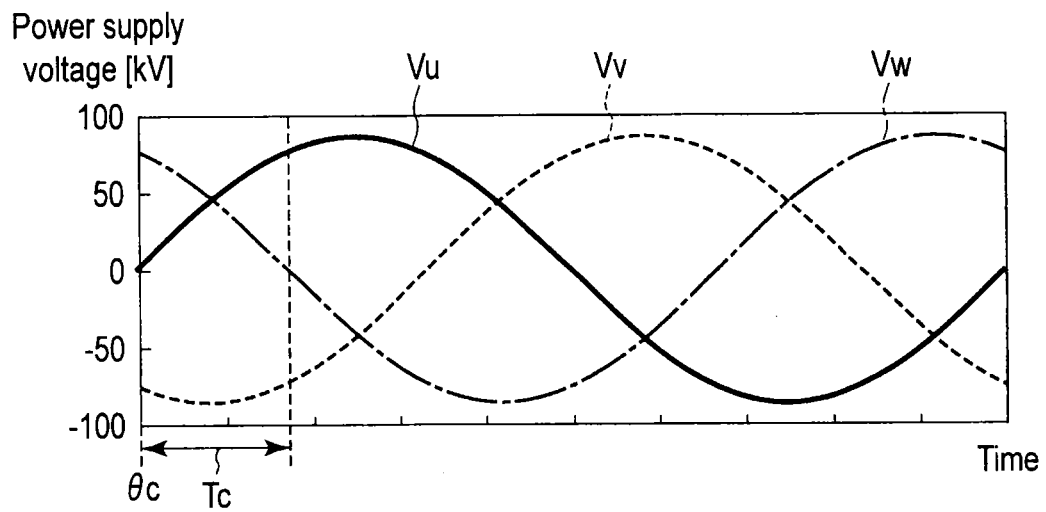
FIG. 4 is a waveform chart showing the relationship between the close phase of the circuit-breaker according to the first embodiment and the power supply voltage.
Figure 5:
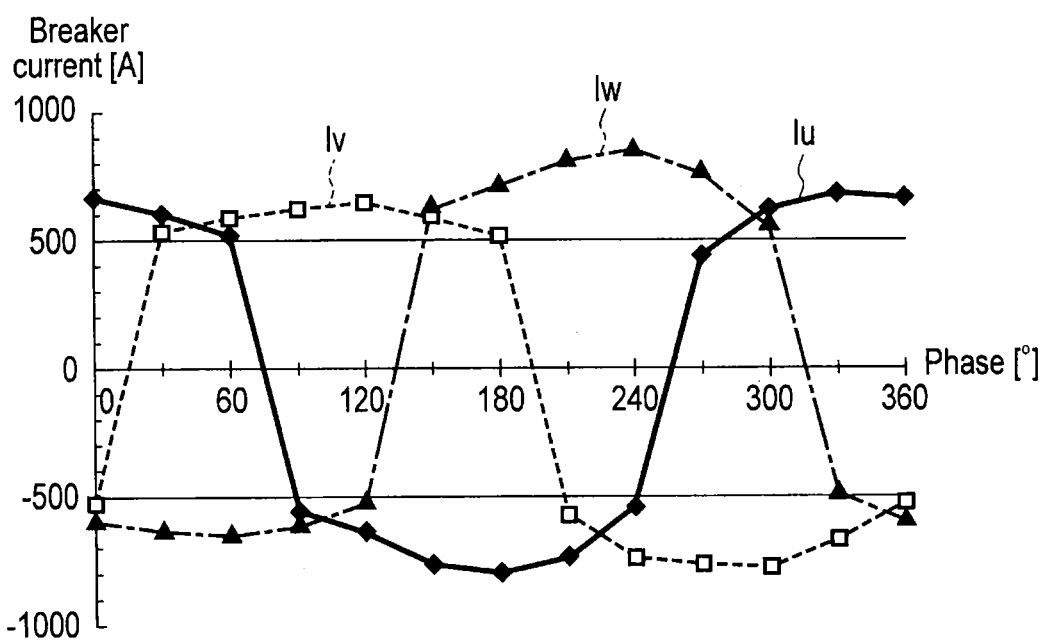
FIG. 5 is a graph showing the relationship between the close phase of the circuit-breaker according to the first embodiment and the circuit-breaker current of each phase.

FIG. 2 is a waveform chart showing circuit-breaker currents Iu, Iv, and Iw before and after current interruption by the circuit-breaker 2. FIG. 3 is a waveform chart showing line magnetic fluxes φuv, φvw, and φwu before and after current interruption by the circuit-breaker 2. FIG. 4 is a waveform chart showing the relationship between the close phase of the circuit-breaker 2 and power supply voltages Vu, Vv, and Vw. FIG. 5 is a graph showing the relationship between the close phase of the circuit-breaker 2 and the circuit-breaker currents Iu, Iv, and Iw of the individual phases. FIG. 3 shows the line magnetic fluxes φuv, φvw, and φwu with respect to the circuit-breaker currents Iu, Iv, and Iw shown in FIG. 2. FIGS. 4 and 5 show a case in which the circuit-breaker is closed in the interrupted state shown in FIGS. 2 and 3.

The magnetizing inrush current suppressing device 6 includes a power supply voltage measurement unit 601, current measurement unit 602, first interruption phase detection unit 603, phase detection unit 604, and close command output unit 605.

The power supply voltage measurement unit 601 measures the individual phase voltages of the power supply bus 1 based on the detection signals detected by the power supply voltage detectors 4U, 4V, and 4W. The power supply voltage measurement unit 601 outputs measured individual phase voltages Vu, Vv, and Vw to the phase detection unit 604.

The current measurement unit 602 measures the individual phase currents Iu, Iv, and Iw flowing through the circuit-breaker 2 based on the detection signals detected by the current detectors 5U, 5V, and 5W. The current measurement unit 602 outputs the measured individual phase currents Iu, Iv, and Iw to the first interruption phase detection unit 603.

The first interruption phase detection unit 603 detects a first interruption phase based on the individual phase currents Iu, Iv, and Iw measured by the current measurement unit 602. The first interruption phase is one of the three phases for which an electric current is interrupted (becomes zero) for the first time. Referring to FIG. 2, the first interruption phase is the U phase. In the non-effectively grounded system as shown in FIG. 2, one phase (the U phase) first undergoes current interruption, and then two remaining phases (the V and W phases) undergo current interruption at the same time.

After detecting the first interruption phase, the first interruption phase detection unit 603 detects the polarity of an electric current having flowed through the first interruption phase immediately before the interruption. In FIG. 2, the electric current Iu of the U phase as the first interruption phase is interrupted at a zero point through which the electric current passes when changing from the negative polarity to the positive polarity. Accordingly, the first interruption phase detection unit 603 detects the negative polarity as the polarity immediately before the current interruption of the first interruption phase. The first interruption phase detection unit 603 outputs the detected first interruption phase and polarity to the phase detection unit 604.

The phase detection unit 604 receives the first interruption phase and polarity detected by the first interruption phase detection unit 603, and the individual phase voltages Vu, Vv, and Vw measured by the power supply voltage measurement unit 601. The phase detection unit 604 detects a phase θc of the zero point through which the detected first interruption phase of the power supply voltages Vu, Vv, and Vw passes when changing from the same polarity as the detected polarity of the first interruption phase of the electric currents Iu, Iv, and Iw to the opposite polarity. When current interruption is performed in the state shown in FIG. 2, therefore, the phase detection unit 604 detects the phase θc of the zero point through which the power supply voltage Vu of the U phase passes when changing from the negative polarity as the polarity of the U-phase current Iu immediately before the interruption to the positive polarity. The phase detection unit 604 outputs the detected phase θc to the close command output unit 605.

The close command output unit 605 sets 60° or less from the phase θc detected by the phase detection unit 604 as a target close phase range Tc. Within the target close phase range Tc, the close command output unit 605 outputs a close command to an operation mechanism which drives the main contacts of the three phases of the circuit-breaker 2. As a result, the circuit-breaker 2 is closed for the three phases simultaneously.

Next, magnetizing inrush current suppression by the magnetizing inrush current suppressing device 6 will be explained.

As shown in FIG. 2, a case will be explained in which the U-phase current Iu is interrupted as the first interruption phase at time t1 at a zero point through which the U-phase current Iu passes when changing from the negative polarity to the positive polarity and the V-phase current Iv and W-phase current Iw are simultaneously interrupted at time t2.

In this case, the residual magnetic fluxes φuv, φvw, and φwu are generated after time t2 in the lines in the transformer 3 as shown in FIG. 3. The residual magnetic flux φwu between the W and U phases is largest among the three lines, and has positive polarity. The residual magnetic fluxes φuv and φvw of the other lines have negative polarity.

FIG. 5 shows the circuit-breaker currents Iu, Iv, and Iw of the individual phases when the close phase is changed from the phase θc detected by the phase detection unit 604 to 360° at the power supply voltages Vu, Vv, and Vw shown in FIG. 4. As shown in FIG. 5, when the circuit-breaker is closed within the target close phase range Tc of the magnetizing inrush current suppressing device 6, the circuit-breaker currents Iu, Iv, and Iw of the individual phases have current values in almost a steady state.

Also, a phase after 60° from the phase θc detected by the phase detection unit 604 is the zero point of the W-phase power supply voltage Vw. This zero point of the W-phase power supply voltage Vw can be detected in the same manner as the zero point of the U-phase voltage Vu of the phase θc detected by the interrupted U-phase current Iu. Specifically, the polarity of the W-phase current Iw immediately before the interruption is detected. The W phase is a phase advanced by 120° from the U phase as the first interruption phase. Referring to FIG. 2, the W phase has positive polarity. Then, in the W-phase power supply voltage Vw, when the detected polarity changes from the positive polarity to the negative polarity the pass-through is detected as a zero point. This makes it possible to detect a phase after 60° from the phase θc detected by the phase detection unit 604.

In this embodiment, the target close phase range Tc is determined by detecting the first interruption phase and the polarity of an electric current immediately before the first interruption phase is interrupted. Accordingly, the circuit-breaker 2 can be closed so as to suppress a magnetizing inrush current even when the load 7 is connected to the transformer 3.

Also, if the current interruption points of time are shifted between the individual phases when a non-effectively grounded transformer is shut down, a DC voltage remains in the transformer. Therefore, if the phase voltage in which the DC voltage remains is directly integrated, a magnetic flux diverges, so the residual magnetic flux cannot accurately be calculated. When the load 7 is connected to the transformer 3 as shown in FIG. 1, the three phases are unavoidably shifted at the time of current interruption. When powering on the transformer 3 to which the load 7 is connected, it is therefore difficult to determine a close phase which suppresses a magnetizing inrush current by a method of determining the close phase by calculating a residual magnetic flux for each phase.

By contrast, in this embodiment, no magnetic flux need be calculated even when powering on the transformer 3 to which the load 7 is connected. This makes it possible to suppress a magnetizing inrush current.

(Second Embodiment)

Figure 6:
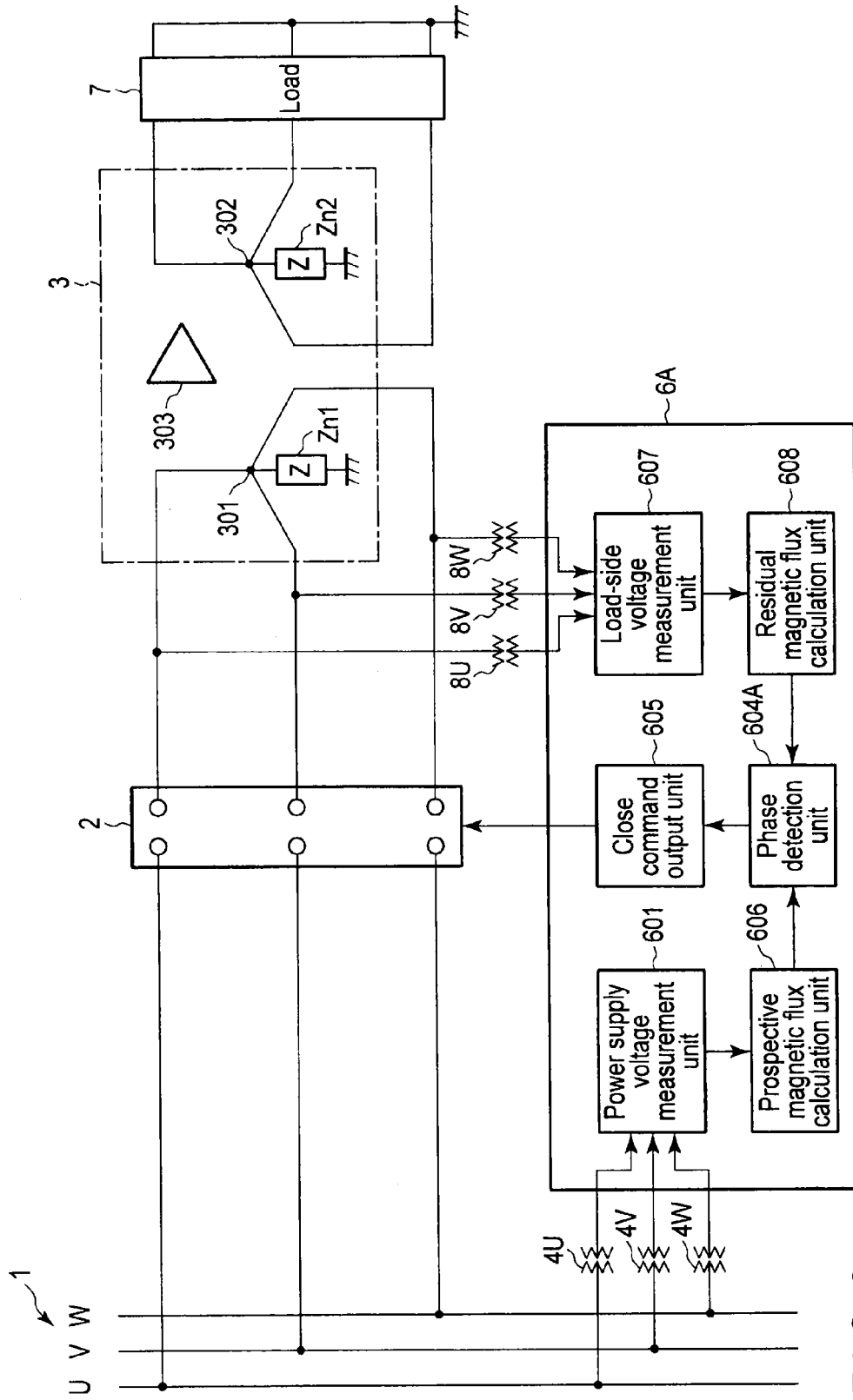
FIG. 6 is a view showing the configuration of a power system to which a magnetizing inrush current suppressing device according to the second embodiment of the present invention is applied.

FIG. 6 is a view showing the configuration of a power system to which a magnetizing inrush current suppressing device 6A according to the second embodiment of the present invention is applied.

The power system according to this embodiment is obtained by replacing the magnetizing inrush current suppressing device 6 with the magnetizing inrush current suppressing device 6A, and the current detectors 5U, 5V, and 5W with load-side voltage detectors 8U, 8V, and 8W, in the power system according to the first embodiment shown in FIG. 1. Other features are the same as the first embodiment.

The three load-side voltage detectors 8U, 8V, and 8W are measurement devices for measuring the phase voltages (ground voltages) of the individual phases (U, V, and W phases) on the primary side of a transformer 2. For example, the load-side voltage detectors 8U, 8V, and 8W are voltage dividers such as VTs (Voltage Transformers) or PDs (Potential Devices). The load-side voltage detectors 8U, 8V, and 8W are installed for the individual phases of the primary terminals of a transformer 3. The load-side voltage detectors 8U, 8V, and 8W output detected values as detection signals to the magnetizing inrush current suppressing device 6A.

Figure 7:
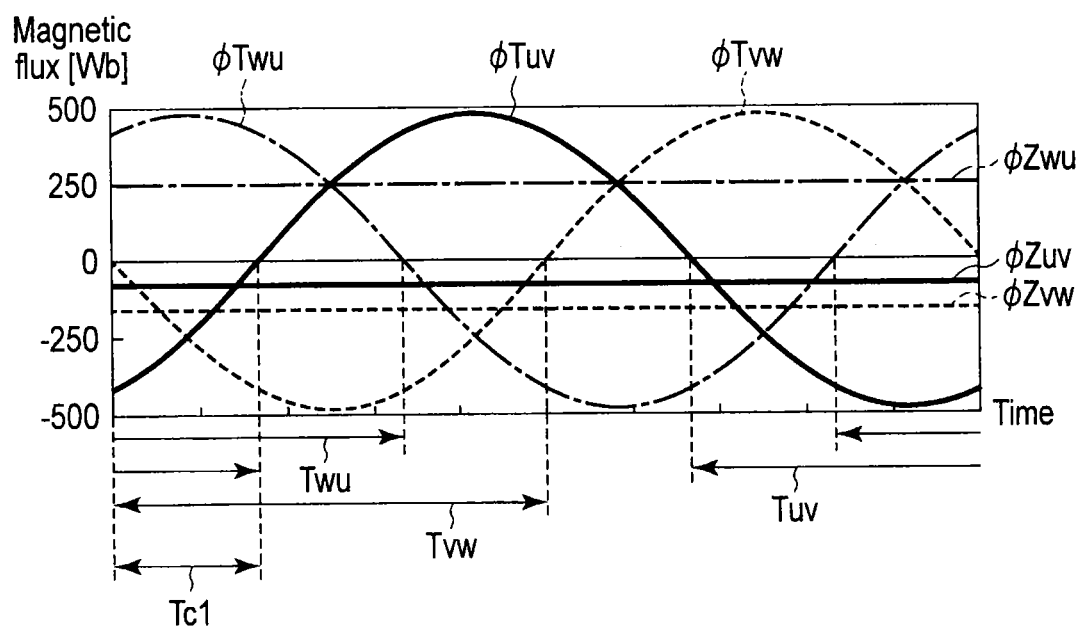
FIG. 7 is a waveform chart showing magnetic flux waveforms for explaining a target close phase range of the magnetizing inrush current suppressing device according to the second embodiment.

FIG. 7 is a waveform chart showing magnetic flux waveforms for explaining a target close phase range Tc1 of the magnetizing inrush current suppressing device 6A according to this embodiment. A case in which the transformer 3 is powered on in the current interrupted state shown in FIGS. 2 and 3 will be described below.

The magnetizing inrush current suppressing device 6A has an arrangement in which a load-side voltage measurement unit 607 and residual magnetic flux calculation unit 608 are formed instead of the current measurement unit 602 and first interruption phase detection unit 603, a phase detection unit 604A is formed instead of the phase detection unit 604, and a prospective magnetic flux calculation unit 606 is added, in the magnetizing inrush current suppressing device 6 according to the first embodiment shown in FIG. 1. Other features are the same as the first embodiment.

The prospective magnetic flux calculation unit 606 receives phase voltages Vu, Vv, and Vw measured by a power supply voltage measurement unit 601. Based on the phase voltages Vu, Vv, and Vw measured by the power supply voltage measurement unit 601, the prospective magnetic flux calculation unit 606 calculates line voltages between the U and V phases, the V and W phases, and the W and U phases. The prospective magnetic flux calculation unit 606 integrates each calculated line voltage. The prospective magnetic flux calculation unit 606 uses these integrated values as magnetic fluxes under a steady state (prospective magnetic fluxes) φTuv, φTvw, and φTwu. The prospective magnetic flux calculation unit 606 outputs the calculated prospective magnetic fluxes φTuv, φTvw, and φTwu to the phase detection unit 604A.

The load-side voltage measurement unit 607 measures the primary voltages of the individual phases of the transformer 3 based on detection signals detected by the load-side voltage detectors 8U, 8V, and 8W. The load-side voltage measurement unit 607 outputs the measured phase voltages to the residual magnetic flux calculation unit 608.

Based on the phase voltages measured by the load-side voltage measurement unit 607, the residual magnetic flux calculation unit 608 calculates line voltages Vuv, Vvw, and Vwu between the U and V phases, the V and W phases, and the W and U phases after the transformer 3 is shut down by the circuit-breaker 2. The residual magnetic flux calculation unit 608 integrates the calculated line voltages Vuv, Vvw, and Vwu. The residual magnetic flux calculation unit 608 sets the integrated values as residual magnetic fluxes (primary line magnetic fluxes) $\phi$uv, $\phi$Zvw, and $\phi$Zwu of the core of the transformer 3. The residual magnetic flux calculation unit 608 outputs the calculated residual magnetic fluxes $\phi$Zuv, $\phi$Zvw, and $\phi$Zwu to the phase detection unit 604A.

As shown in FIG. 7, the phase detection unit 604A detects, for the individual lines, phase sections Tuv, Tvw, and Twu in which the polarities of the prospective magnetic fluxes $\phi$Tuv, $\phi$Tvw, and $\phi$Twu calculated by the prospective magnetic flux calculation unit 606 match those of the residual magnetic fluxes $\phi$Zuv, $\phi$Zvw, and $\phi$Zwu calculated by the residual magnetic flux calculation unit 608. The phase detection unit 604A identifies a section Tc1 in which the phase sections Tuv, Tvw, and Twu detected for the individual lines overlap each other in all the three sections. The identified section Tc1 is the target close phase range in which the circuit-breaker 2 is closed. The phase detection unit 604A outputs the detected target close phase range Tc to a close command output unit 605.

Within the target close phase range Tc1 detected by the phase detection unit 604A, the close command output unit 605 outputs a close command to an operation mechanism which drives the main contacts of the three phases of the circuit-breaker 2. As a result, the circuit-breaker 2 is closed.

The target close phase range Tc1 detected by the phase detection unit 604A matches the target close phase range Tc detected by the phase detection unit 604 of the first embodiment shown in FIG. 4. That is, the effect of suppressing a magnetizing inrush current when the circuit-breaker 2 is closed in the target close phase range Tc1 is as shown in FIG. 5 explained in the first embodiment. Accordingly, the close command output unit 605 can suppress a magnetizing inrush current by closing the circuit-breaker 2 in the target close phase range Tc1 detected by the phase detection unit 604A.

In this embodiment, the same effect as that of the first embodiment can be obtained by closing the circuit-breaker 2 in the phase range Tc1 in which the polarities of the residual magnetic fluxes $\phi$Zuv, $\phi$Zvw, and $\phi$Zwu respectively match the polarities of the prospective magnetic fluxes $\phi$Tuv, $\phi$Tvw, and $\phi$Twu in all the lines.

As described previously, a direct current (DC) voltage remains if the non-effectively grounded transformer 3 is shut down by the circuit-breaker 2 while a load 7 is connected to the transformer 3. In this case, the residual magnetic flux of the transformer 3 cannot accurately be calculated by integrating a phase voltage in which the DC voltage remains. However, the DC voltage has no influence on the line voltage. In the magnetizing inrush current suppressing device 6A, therefore, the residual magnetic flux can be accurately calculated by integrating the line voltage.

(Third Embodiment)

FIG. 8 is a view showing the configuration of a power system to which a magnetizing inrush current suppressing device 6B according to the third embodiment of the present invention is applied.

The power system according to this embodiment is obtained by replacing the magnetizing inrush current suppressing device 6A with the magnetizing inrush current suppressing device 6B in the power system according to the second embodiment shown in FIG. 6. Other features are the same as the second embodiment.

The magnetizing inrush current suppressing device 6B is obtained by replacing the phase detection unit 604A with a phase detection unit 604B in the magnetizing inrush current suppressing device 6A according to the second embodiment. Other features are the same as the second embodiment.

A method of detecting a target close phase $\theta$c1 by the phase detection unit 604B will be explained with reference to FIG. 9. Note that prospective magnetic fluxes $\phi$Tuv, $\phi$Tvw, and $\phi$Twu and residual magnetic fluxes $\phi$Zuv, $\phi$Zvw, and $\phi$Zwu shown in FIG. 9 are the same as those shown in FIG. 7. Accordingly, a current interrupted state is the same as that shown in FIGS. 2 and 3.

The phase detection unit 604B determines among which one of the absolute values of the residual magnetic fluxes $\phi$Zuv, $\phi$Zvw, and $\phi$Zwu in the three lines is at maximum. Referring to FIG. 9, the residual magnetic flux $\phi$Zwu between the W and U phases has a maximum absolute value. Among the lines having the maximum absolute value, the phase detection unit 604B detects the phase $\theta$c1 at the peak value point of the prospective magnetic fluxes $\phi$Tuv, $\phi$Tvw, and $\phi$Twu within a range in which the prospective magnetic fluxes $\phi$Tuv, $\phi$Tvw, and $\phi$Twu match the residual magnetic fluxes $\phi$Zuv, $\phi$vw, and $\phi$Zwu. In FIG. 9, the phase detection unit 604B detects the phase $\theta$c1 at which the prospective magnetic flux $\phi$Twu between the W and U phases has a peak value in a section Twu in which both the residual magnetic flux $\phi$Zwu between the W and U phases and the prospective magnetic flux $\phi$Twu between the W and U phases have the positive polarity. The phase detection unit 604B outputs the detected phase $\theta$c1 as a target close phase to a close command output unit 605. The target close phase $\theta$c1 detected by the phase detection unit 604B is the phase of the intermediate point of the target close phase range Tc1 detected by the phase detection unit 604A according to the second embodiment.

At the target close phase $\theta$c1 detected by the phase detection unit 604B, the close command output unit 605 outputs a close command to an operation mechanism which drives the main contacts of the three phases of a circuit-breaker 2. As a result, the circuit-breaker 2 is closed.

In this embodiment, the same effect as that of the second embodiment can be obtained.

Note that in the above embodiments, the various parameters in phase control by the magnetizing inrush current suppressing devices 6 to 6B may also be corrected in order to, e.g., further increase the accuracy. For example, when the circuit-breaker 2 is closed, a preceding discharge called pre-arc occurs between the main contacts, or the close time varies due to, e.g., operation variations of the operation mechanisms. By pre-acquiring the characteristics of the close variation caused by the pre-arc and the variation when the circuit-breaker is closed, these variations can be corrected by using their characteristics when performing phase control. By performing this correction, a magnetizing inrush current can be suppressed more reliably even when these variations occur.

Also, in each embodiment, the power supply voltage detectors 4U, 4V, and 4W measure the individual phase voltages of the power supply bus 1. However, it is also possible to measure the individual line voltages of the power supply bus 1, and convert the line voltages into phase voltages. This similarly applies to the load-side voltage detectors 8U, 8V, and 8W in the second and third embodiments.

In addition, the circuit-breaker 2 is a three-phase integrated type circuit-breaker in each embodiment, but may also be single-phase operation type circuit-breakers which are operated for the individual phases. When using the single-phase operation type circuit-breakers, the same effect as that of the three-phase integrated type circuit-breaker can be obtained by simultaneously closing the circuit-breakers of the individual phases.

Also, in each embodiment, the transformer 3 can be any transformer as long as it is a three-phase transformer. The transformer 3 is not limited to a three-winding transformer and may also be a two-winding transformer. In addition, the connection of each winding can be either a Y-connection or Δconnection, and it is possible to use any combination of these connections.

Furthermore, in the above embodiments, the calculation order and the calculation locations (e.g., computers and various detectors regardless of whether they are inside or outside of the magnetizing inrush current suppressing devices 6 to 6B) can be changed as needed, provided that the same results are obtained.

In the first embodiment, the current detectors 5U, 5V, and 5W can detect an electric current in any place as long as the polarity of an electric current having flowed through the transformer 3 immediately before the circuit-breaker 2 is opened can be known. Accordingly, the current detectors 5U, 5V, and 5W can detect an electric current in any place as long as it is an electric current flowing from the power supply bus 1 to the load 7.

Furthermore, in the second and third embodiments, the prospective magnetic fluxes φTuv, φTvw, and φTwu and residual magnetic fluxes φZuv, φZvw, and φZwu are calculated after the voltages are converted, e.g., after the phase voltages are converted into the line voltages. However, it is also possible to convert the magnetic fluxes after they are calculated. For example, when calculating each line magnetic flux from each phase voltage, it is also possible to first calculate each phase magnetic flux, and then calculate each line magnetic flux.

While certain embodiments according to the present invention have been described, these embodiments have been presented by way of example only, and are not intended to limit the scope of the invention. The novel embodiments described herein may be implemented in a variety of other forms, and various omissions, substitutions, and/or changes may be made therein without departing from the spirit of the inventions. The accompanying claims and their equivalents are intended to cover such forms or modifications as would fall within the scope and spirit of the inventions.

What is claimed is:

1. A magnetizing inrush current suppressing device for controlling a circuit-breaker which opens and closes a connection between a three phase transformer and a three phase AC power supply while a load is connected to the three phase transformer to suppress a magnetizing inrush current, comprising:
    a power supply side voltage measurement unit configured to measure a three phase AC voltage on the power supply side of the circuit-breaker;
    a current measurement unit configured to measure a three phase alternating current flowing from the power supply to the load;
    a first interruption phase detection unit configured to detect a first interruption phase as a phase of an electric current which is interrupted first among the three phases, based on the three phase alternating current measured by the current measurement unit;
    a phase detection unit configured to detect a phase of a phase voltage zero point through which a phase voltage of the first interruption phase, which is detected by the first interruption phase detection unit, of the three phase AC voltage measured by the power supply side voltage measurement unit passes when changing from the same polarity as that of an electric current immediately before interruption of the first interruption phase to an opposite polarity; and
    a closing unit configured to close the circuit-breaker at a phase within 60° from the phase detected by the phase detection unit.

2. A magnetizing inrush current suppressing device for controlling a circuit-breaker which opens and closes a connection between a three phase transformer and a three phase AC power supply while a load is connected to the three phase transformer to suppress a magnetizing inrush current, comprising:
    a power supply side voltage measurement unit configured to measure a three phase AC voltage on the power supply side of the circuit-breaker;
    a current measurement unit configured to measure a three phase alternating current flowing from the power supply to the load;
    a first interruption phase detection unit configured to detect a first interruption phase as a phase of an electric current which is interrupted first among the three phases, based on the three phase alternating current measured by the current measurement unit;
    a first phase detection unit configured to detect a first phase of a phase voltage zero point through which a phase voltage of the first interruption phase, which is detected by the first interruption phase detection unit, of the three phase AC voltage measured by the power supply side voltage measurement unit passes when changing from the same polarity as that of an electric current immediately before interruption of the first interruption phase to an opposite polarity;
    a second phase detection unit configured to detect a second phase of a phase voltage zero point through which a phase voltage of a phase advanced by 120° from the first interruption phase, which is detected by the first interruption phase detection unit, of the three phase AC voltage measured by the power supply side voltage measurement unit passes when changing from the same polarity as that of an electric current immediately before interruption of the phase advanced by 120° from the first interruption phase to an opposite polarity; and
    a closing unit configured to close the circuit-breaker at a phase between the first phase detected by the first phase detection unit and the second phase detected by the second phase detection unit.

3. A magnetizing inrush current suppressing method of controlling a circuit-breaker which opens and closes a connection between a three phase transformer and a three phase AC power supply while a load is connected to the three phase transformer to suppress a magnetizing inrush current, comprising:
    measuring a three phase AC voltage on the power supply side of the circuit-breaker;
    measuring a three phase alternate current flowing from the power supply to the load;

detecting a first interruption phase as a phase of an electric current which is interrupted first among the three phases, based on the measured three phase alternate current;

detecting a phase of a phase voltage zero point through which a phase voltage of the detected first interruption phase of the measured three phase AC voltage passes when changing from the same polarity as that of an electric current immediately before interruption of the first interruption phase to an opposite polarity; and closing the circuit-breaker at a phase within 60° from the detected phase.

4. A magnetizing inrush current suppressing method of controlling a circuit-breaker which opens and closes a connection between a three phase transformer and a three phase AC power supply while a load is connected to the three phase transformer to suppress a magnetizing inrush current, comprising:

measuring a three phase AC voltage on the power supply side of the circuit-breaker;

measuring a three phase alternate current flowing from the power supply to the load;

detecting a first interruption phase as a phase of an electric current which is interrupted first among the three phases, based on the measured three phase alternate current;

detecting a first phase of a phase voltage zero point through which a phase voltage of the detected first interruption phase of the measured three phase AC voltage passes when changing from the same polarity as that of an electric current immediately before interruption of the first interruption phase to an opposite polarity;

detecting a second phase of a phase voltage zero point through which a phase voltage of a phase advanced by 120° from the detected first interruption phase of the measured three phase AC voltage passes when changing from the same polarity as that of an electric current immediately before interruption of the phase advanced by 120° from the first interruption phase to an opposite polarity; and closing the circuit-breaker at a phase between the detected first phase and the detected second phase.

* * * * *